United States Patent [19]

Sano et al.

[11] Patent Number: 4,831,111

[45] Date of Patent: May 16, 1989

[54] CROSS-LINKED RESIN, COMPOSITION FROM BIS(2-OXAZOLINE)

[75] Inventors: Yasuo Sano, Minoo; Yasuhiro Morisue, Kawabe; Kiyoshi Komiya, Mishima; Yoshimasa Nakamura, Ikeda, all of Japan

[73] Assignee: Takeda Chemical Industries, Inc., Osaka, Japan

[21] Appl. No.: 195,551

[22] Filed: May 18, 1988

Related U.S. Application Data

[62] Division of Ser. No. 799,951, Oct. 29, 1985, Pat. No. 4,764,587.

[30] Foreign Application Priority Data

Nov. 8, 1984 [WO] PCT Int'l Appl. ... PCT/JP84/00537

[51] Int. Cl.$^4$ ............... C08G 83/00; C08G 69/44
[52] U.S. Cl. ..................... 528/363; 524/606; 528/176; 528/179; 528/190; 528/192; 528/205; 528/206; 528/207; 528/208; 528/211; 528/212
[58] Field of Search ......... 528/363, 176, 179, 190, 528/192, 205, 206, 207, 208, 211, 212, 213; 524/606

[56] References Cited

U.S. PATENT DOCUMENTS 4,764,587 8/1988 Sano et al. ................. 528/363

Primary Examiner—Harold D. Anderson
Attorney, Agent, or Firm—Wenderoth, Lind & Ponack

[57] ABSTRACT

A cross-linked resin produced by the reaction of a bis(2-oxazoline) compound with a dicarboxylic acid anhydride, and optionally also with at least one selected from the group consisting of a dicarboxylic acid, a hydroxy-carboxylic acid, a diol and water, in the presence of at least one catalyst selected from the group consisting of an organic phosphorous acid ester, an organic phosphonous acid ester and an inorganic salt at an elevated temperature. The cross-linked resin has a high mechanical strength and a high resistance to organic solvents.

The resin composition comprising the cross-linked resin and reinforcements and/or fillers combined therewith has outstanding heat-resistance and mechanical properties.

17 Claims, No Drawings

CROSS-LINKED RESIN, COMPOSITION FROM BIS(2-OXAZOLINE)

This is a Rule 60 divisional of Ser. No. 799,951, filed Oct. 29, 1985, now U.S. Pat. No. 4,764,587. This invention relates to a cross-linked resin, a process for producing the same, and a resin composition including the same.

It is already known, as disclosed in U.S. Pat. No. 3,476,712, that the reaction of a bis(2-oxazoline) compound with a dicarboxylic acid in an equimolar amount under heating produces linear polyesteramides.

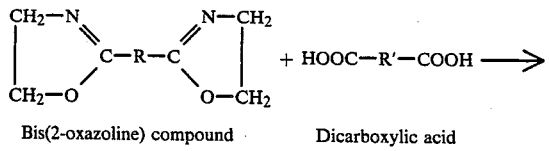

Bis(2-oxazoline) compound      Dicarboxylic acid

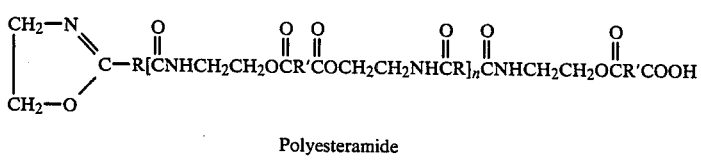

Polyesteramide

It is also known, as disclosed in U.S. Pat. No. 4,474,942, that the reaction of a bis(2-oxazoline) compound with a dicarboxylic acid in a molar ratio of the dicarboxylic acid to the bis(2-oxazoline) compound of not more than about 1 in the presence of an electrophilic reagent catalyst such as a phosphorous acid ester under heating, produces cross-linked polyesteramide resins. However, no thermosetting resin has hitherto been known which is formed by the reaction of a bis(2-oxazoline) compound and a reactant which has no active hydrogen in the molecule.

The present inventors have made an intensive investigation into the reaction of a bis(2-oxazoline) compound with a compound which has no active hydrogen in the molecule, and have found out that the bis(2-oxazoline) compound reacts with a dicarboxylic acid anhydride in the presence of a specific catalyst to provide a three-dimensionally cross-linked resin which has an especially high mechanical strength and an excellent resistance to organic solvents.

It is therefore an object of the invention to provide a cross-linked resin.

It is a further object of the invention to provide a process for producing such a cross-linked resin.

It is a still further object of the invention to provide a resin composition which includes such a cross-linked resin, and a process for producing the same.

It is also an object of the invention to provide a cross-linkable composition to produce such a resin composition.

The cross-linked resin of the invention is obtained by the reaction of bis(2-oxazoline) compound with a dicarboxylic acid anhydride.

The process for producing the cross-linked resin of the invention comprises: reacting a bis(2-oxazoline) compound with a dicarboxylic acid anhydride in a molar ratio of the dicarboxylic acid anhydride to the bis(2-oxazoline) compound of not more than about 2, in the presence of at leas one catalyst selected from the group consisting of a organic phosphorous acid ester, an organic phosphorous acid ester and an inorganic salt at an elevated temperature.

The bis(2-oxazoline) compound used in the present invention has the general formula:

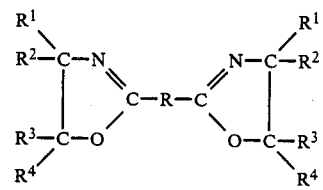

wherein R represents a C-C covalent bond or a divalent hydrocarbon group, preferably an alkylene, a cycloalkylene or an arylene, e.g., phenylene, and $R^1$, $R^2$, $R^3$ and $R^4$ independently represent hydrogen, an alkyl or an aryl. In the case where R is a C-C covalent bond, the bis(2-oxazoline) compound may be 2,2'-bis(2-oxazoline), 2,2'-bis(4-methyl-2-oxazoline) or 2,2'-bis(5-methyl-2-oxazoline). Examples of the bis(2-oxazoline) compound wherein R is a hydrocarbon group are 1,2-bis(2-oxazolinyl-2)ethane, 1,4-bis(2-oxazolinyl-2)butane, 1,6-bis(2-oxazolinyl-2)hexane, 1,8-bis(2-oxazolinyl-2)octane, 1,4-bis(2-oxazolinyl-2)cyclohexane, 1,2-bis(2-oxazolinyl-2)benzene, 1,3-bis(2-oxazolinyl-2)benzene, 1,4-bis(2-oxazolinyl-2)benzene, 1,2-bis(5-methyl-2-oxazolinyl-2)benzene, 1,3-bis(5-methyl-2-oxazolinyl-2)benzene, 1,4-bis(5-methyl-2-oxazolinyl-2)benzene and 1,4-bis(4,4'-dimethyl-2-oxazolinyl-2)benzene. These may be used as a mixture of two or more.

The dicarboxylic acid anhydride used in the invention has the general formula:

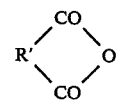

wherein R' is a divalent hydrocarbon group which may have one or more subtituents inactive in the reaction according to the invention, for example, a halogen or a hydrocarbon group. Either of an aromatic, an aliphatic or an alicyclic dicarboxylic acid anhydride is usable. Preferred examples are succinic anhydride, maleic anhydride, itaconic anhydride, phthalic anhydride, tatrahydrophthalic anhydride, hexahydrophthalic anhydride, methylhexahydrophthalic anhydride, endomethylenetetrahydrophthalic anhydride, methyl endomethylenetetrahydrophthalic anhydride, tetrachlorophthalic anhydride and tetrabromophthalic anhydride. The dicarboxylic acid anhydide may be used as a mixture of two or more. Among these is preferred an aromatic dicarboxylic acid, e.g., phthalic anhydride.

The dicarboxylic acid anhydride is used in the reaction in a molar ratio of the dicarboxylic acid anhydride to the bis(2-oxazoline) compound of not more than about 2, usually in the range of about 2–0.1, preferably in the range of about 1–0.3.

According to the invention, the bis(2-oxazoline) compound may be reacted with the dicarboxylic acid anhydride in the presence of an additional reactant which is selected from the group consisting of a dicarboxylic acid, a hydroxycarboxylic acid, a diol and water.

The dicarboxylic acid usable in the invention includes an aliphatic dicarboxylic acid such as malonic acid, succinic acid, glutaric acid, adipic acid, pimelic acid, suberic acid, azelaic acid, sebacic acid, dodecanedioic acid, a dimer acid, eicosanedioic acid or thiodipropionic acid, and an aromatic dicarboxylic acid such as phthalic acid, isophthalic acid, terephthalic acid, naphthalenedicarboxylic acid, diphenylsulfonedicarboxylic acid or diphenylmethanedicarboxylic acid. These may also be used as a mixture of two or more. When the dicarboxylic acid is used as an additional reactant together with the dicarboxylic acid anhydride, the mixture of the anhydride and the dicarboxylic acid contains the anhydride in amounts of not less than about 1 mole % based on the dicarboxylic acid, and further the molar ratio of the mixture to the bis(2-oxazoline) compound is not more than about 1, usually in the range of about 1–0.2.

The hydroxy-carboxylic acid usable as the additional reactant includes an aliphatic, an alicyclic and an aromatic hydroxy-carboxylic acid, among which an aromatic hydroxy-carboxylic acid is preferably used, for example, benzene derivatives such as salicylic acid, m-hydroxybenzoic acid, p-hydroxybenzoic acid, o-cresotic acid, gallic acid, mandelic acid or tropic acid, and naphthalene derivatives such as $\alpha$-hydroxynaphthoic acid or $\beta$-hydroxynaphthoic acid. When the hydroxy-carboxylic acid is used as an additional reactant, it is used in such a manner that the mixture of the dicarboxylic acid anhydride and the hydroxy-carboxylic acid contains not less than about 1 mole % of the anhydride based on the hydroxy-carboxylic acid, and further the molar ratio of mixture to the bis(2-oxazoline) compound is not more than about 1, usually in the range of about 1–0.2.

A mixture of the dicarboxylic acid and the hydroxy-carboxylic acid is also usable as the additional reactant. In this case also, the mixture is used in such a manner that the mixture contains not less than about 1 mole % of the dicarboxylic acid anhydride based on the total amount of the dicarboxylic acid and the hydroxy-carboxylic acid, and further the molar ratio of the mixture of the dicarboxylic acid anhydride, the dicarboxylic acid and the hydroxycarboxylic acid to the bis(2-oxazoline) compound is not more than about 1, normally in the range of about 1–0.2.

Further according to the invention, the bis(2-oxazoline) compound may be reacted with the dicarboxylic acid anhydride in the presence of water in amounts of about 10–90 mole % of the dicarboxylic acid anhydride. This method provides substantially the same cross-linked resin as that which is obtained by the use of a mixture of a dicarboxylic acid anhydride and a dicarboxylic acid. For example, when the bis(2-oxazoline) compound is reacted with phthalic anhydride in the presence of water, a cross-linked resin results which is substantially the same as that which is obtained by the reaction of the bis(2-oxazoline) compound with a mixture of phthalic anhydride and phthalic acid. The reaction in the presence of water as above is often advantageous over the reaction wherein the bis(2-oxazoline) compound is reacted with only the dicarboxylic acid, although depending upon a dicarboxylic acid used. For example, phthalic acid has a high melting point and remains unmelted in the reaction, and therefore it results that the reaction efficiency is low. However, when phthalic anhydride is reacted with the bis(2-oxazoline) compound in the presence of water, the reaction smoothly proceeds, and the reaction efficiency is high.

A diol or a dihydroxy compound is also usable as an additional reactant. The amount used is preferably about 5–45 mole % of the dicarboxylic acid anhydride. In this method, portions of the dicarboxylic acid anhydride may react with the diol to provide a dicarboxylic acid having carboxylic acid ester linkages in the molecule, which in turn may react with the bis(2-oxazoline) compound in the same manner as the dicarboxylic acid, with the simultaneous reaction of the dicarboxylic acid anhydride with the bis(2-oxazoline) compound, to produce the cross-linked resin of the invention.

The diol usable is, for example, a glycol such as ethylene glycol, propylene glycol, 1,3-butylene glycol, 1,4-butyleneglycol, neopentyl glycol, hydrogenated bisphenol A, diethylene glycol, triethylene glycol, dipropylene glycol, an adduct of bisphenol A with propylene oxide, and an oligomer diol such as polyethylene glycol, polypropylene glycol, polytetramethylene glycol or polybutadiene glycol. Among these diols are preferably used an alkylene glycol and a polyalkylene glycol, e.g., propylene glycol and a polyethylene glycol.

According to the invention, the cross-linking reaction of the bis(2-oxazoline) compound is carried out in the presence of an electrophilic reagent catalyst which specifically includes an organic phosphorous acid ester, an organic phosphonous acid ester and an inorganic salt. Among these catalysts an organic phosphorous acid ester is most preferred particularly because of its high catalytic activity and high solubility in the reaction mixture.

The phosphorous acid ester is preferably a diester or a triester such as triphenyl phosphite, tris(nonylphenyl) phosphite, triethyl phosphite, tri-n-butyl phosphite, tris(2-ethylhexyl) phosphite, tristearyl phosphite, diphenylmonodecyl phosphite, tetraphenyl dipropyleneglycol diphosphite, tetraphenyltetra(tridecyl)pentaerythriol tetraphosphite, diphenyl phosphite, 4,4'-butylidenebis(3-methyl-6-t-butylphenyl-di-tridecyl) phosphite and bisphenol A pentaerythritol phosphite. These may be used as a mixture of two or more. Among these phosphites, those which have phenoxy or substituted phenoxy groups are particularly preferred.

Examples of organic phosphonous acid ester includes esters of an aliphatic or aromatic phosphonous acid, such as diphenyl phenylphosphonite, di($\beta$-chloroethyl)$\beta$-chloroethylphosphonite or tetrakis(2,4-di-t-butylphenyl)-4,4'-diphenylendiphosphonite.

Various inorganic salts soluble in the reaction mixture are also effective as the catalyst. It is preferred that the salt does not have water of crystallization. Preferred inorganic salts usable as the catalyst are composed of a monovalent to tetravalent cation (inclusive of polyatomic cations, e.g., vanadyl or zirconyl) such as lithium, potassium, sodium, magnesium, calcium, titanium, zirconium, vanadium, chromium, manganese, iron, cobalt, nickel, copper, zinc, cadmium, aluminum, tin or cerium, with an anion such as a halide, a nitrate, a sulfate or a chlorate. Among these salts, cupric chloride, vanadium chloride, vanadyl chloride, cobalt nitrate, zinc chloride, manganese chloride and bismuth chloride exhibit excellent catalytic activity. The catalyst may be used singly or as a mixture of two or more of the above.

The catalyst is used in amounts of 0.1–5% by weight, preferably 0.4–2% by weight based on the weight of a mixture of the reactant, i.e., the bis(2-oxazoline) compound, the dicarboxylic acid anhydride, and the additional reactant when being used. The cross-linking reaction is too slow when insufficient amounts of catalyst is used, while the reaction provides a cross-linked resin with unsatifactory properties when excess amounts of the catalyst are used.

The reaction temperature or curing temperature at which the cross-linking reaction of the bis(2-oxazoline) compound proceeds smoothly depends on the bis(2-oxazoline) compound and the other individual reactants as well as the catalyst used, and hence it is not specifically limited, however, usually it is not lower than about 100° C., and preferably in the range of about 150° C. to 250° C. The reaction time or gelation time also varies depending on the individual reactants as well as the catalyst used, but usually in the range of about 1 minute to a few hours.

The cross-linked resin as obtained above has a complicated structure and at present the precise chemical structure cannot be presented herein. However, the resin has especially a high mechanical strength and a high resistance to organic solvents. It is also possible according to the invention to provide a resin with an excellent heat-resistance by selecting properly the reactants used. Therefore, the cross-linked resin of the invention is suitably applied to the production of machinery parts such as rolls and gears, embedded moldings for electrical machinery parts and electric insulating materials.

According to the invention, there is provided a resin composition which comprises the cross-linked resin as obtained as above and reinforcements and/or fillers combined therewith.

As the reinforcement, fibrous reinforcements which are used in the production of ordinary fiber reinforced resins are preferable. Specific examples of such fibrous reinforcements are inorganic fibers such as glass fibers, carbon fibers, quartz fibers, ceramic fibers, zirconia fibers, boron fibers, tungsten fibers, molybdenum fibers, steel fibers, berylium fibers and asbestos fibers, natural fibers such as cotton, flax, hemp, jute or sisal hemp, and synthetic fibers having heat-resistance at the reaction temperature such as polyamide fibers or polyester fibers. In order to improve the adhesion to the cross-linked resin, the fibrous reinforcement may be treated in advance with, for example, chromium compounds, silane, vinyltriethoxysilane or aminosilane. These fibrous reinforcements may be used singly or in combination of two or more. Also the reinforcement may be used in various forms, for example, strands, mats, fabrics, tapes or short fibers of a uniform length. The combined use of the fibrous reinforcement of two or more of the forms may be adopted when desired.

The amount of the reinforcement may be selected, for example, upon the viscosity of the melted mixture, the reinforcement used, the requirements for cured products, etc., however, it is usually in the range of about 3–95% by weight, preferably about 10–80% by weight based on the resin composition.

Various fillers may also be incorporated into the cross-linked resin. Preferred examples of the filler include oxides such as silica, alumina or titanium dioxide, hydroxides such as aluminum hydroxide, carbonates such as calcium carbonate or magnesium carbonate, silicates such as talc, clay, glass beads or bentonite, carbon materials such as carbon black, metal powders such as iron powder or aluminum powder. The amount of the filler may be selected as in the case of the reinforcement, and it is usually in the range of about 3–95% by weight, preferably about 10–80% by weight based on the resin composition.

The resin composition may further contain any additive, e.g., stabilizers, pigments, fire retardants and the like which are used in ordinary thermosetting resin compositions.

The resin composition is obtained by heating a cross-linkable composition of the invention which contains the bis(2-oxazoline) compound, the dicarboxylic acid anhydride, the catalyst, and the reinforcements and/or fillers, and when desired, the additional reactant as aforementioned. The heating of this cross-linkable composition provides a cross-linked resin composition combined with the reinforcement and/or filler.

The cross-linkable composition is obtainable, for example, by heating a reactant mixture of the bis(2-oxazoline) compound, the dicarboxylic acid anhydride, and when desired one or more of the additional reactants, and the catalyst, to fluidise the mixture, and then by mixing or impregnating the reinforcement and/or filler with the fluidised reactant mixture. The catalyst may be added to and mixed with the reactant after it has melted, and then the fluidised mixture is applied to the reinforcement and/or filler. The cross-linkable composition is suitably used as a molding material in various molding processes.

For the production of the fiber reinforced cross-linked resin in particular, any known method is adoptable. By way of examples, the fluidised molding material as above is injected into fibrous reinforcements disposed in a mold to impregnate the reinforcement with the molding material, and then is heated under a pressure, as in the preform matched metal die process or resin injection process; the molding material is mixed and kneaded with fibrous reinforcements of a uniform length, and the resultant mixture is disposed or injected into a mold, followed by heating under a pressure, as in the bulk molding compound process, transfer process, injection molding or RIM process; or fibrous reinforcements are impregnated with the molding material to form a prepreg, which is then heated under pressure, as in the SMC process or prepreg cloth process.

In molding with the use of cross-linkable composition, the molding temperature is usually about 160–230° C., and the molding time is usually 1 minute to 1 hour although it varies depending on the reactants and the catalyst used as well as the molding temperature.

The resin composition of the invention combined with the reinforcement and/or filler, especially the fibrous reinforcement, has excellent properties over conventional fiber reinforced resins which are ever known, and in particular the composition has a very high heat-resistance on account of the cross-linked resin of the invention.

Therefore, the resin composition of the invention finds applications not only in the application fields for conventional fiber-reinforced or filler-containing plastics, such as applications in aircraft, craft, railway vehicles, automobiles, civil engineering, construction and building, electrical and electronic appliances, anti-corrosion equipment, sporting and leisure goods, medical and industrial parts, but also in new applications where conventional fiber-reinforced and filler-containing plastics have failed to achieve application development. The present invention will be more easily understood with reference to the following examples, which however are intended to illustrate the invention only and are not to be construed as limiting the scope of the invention. In the examples, the thermal deflection temperature was measured under a load of 18.6 kg/cm$^2$ applied to a sample resin sheet.

EXAMPLE 1

An equimolar mixture of 59.3 g of 1,3-bis(2-oxazolinyl-2)benzene and 40.7 g of phthalic anhydride was heated in an oil bath of 150° C. When the mixture reached about 100° C. and became slurry, 1 g of triphenyl phosphite was added to the mixture. When the temperature of the mixture was over about 120° C., the mixture completely melted to form a viscous liquid. The liquid was then poured into a mold which had a cavity of 3 mm in width and had been in advance heated to 200° C., and then was left standing in an oven at 200° C. for 1 hour.

The resultant resin sheet was transparent and yellowish brown, and was found infusible. Some properties of the resin are shown below.

| | |
|---|---|
| Thermal deflection temperature | 162° C. |
| Flexural strength | 7.4 kgf/mm$^2$ |
| Flexural modulus | 320 kgf/mm$^2$ |
| Surface hardness (Shore D) | 92 |

EXAMPLE 2

A mixture of 68.6 g of 1,3-bis(2-oxazolinyl-2)benzene and 31.4 g of phthalic anhydride wherein the molar ratio of the former to the latter was 1.5 was worked up in the same manner as in Example 1, to provide a undissolvable and unmeltable cross-linked resin sheet, which was found to have the following properties.

| | |
|---|---|
| Thermal deflection temperature | 285° C. |
| Flexural strength | 16.7 kgf/mm$^2$ |
| Flexural modulus | 550 kgf/mm$^2$ |
| Surface hardness (Shore D) | 96 |

EXAMPLE 3

A mixture of 74.5 g of 1,3-bis(2-oxazolinyl-2)benzene and 25.5 g of phthalic anhydride wherein the molar ratio of the former to the latter was 2.0 was worked up in the same manner as in Example 1, to provide an insoluble and infusible cross-linked resin sheet, which was found to have the following properties.

| | |
|---|---|
| Thermal deflection temperature | 240° C. |
| Flexural strength | 10.4 kgf/mm$^2$ |
| Flexural modulus | 460 kgf/mm$^2$ |
| Surface hardness (Shore D) | 94 |

EXAMPLE 4

A mixture of 68.9 g (0.319 mole) of 1,3-bis(2-oxazolinyl-2)benzene, 24.8 g (0.17 mole) of adipic acid and 6.3 g (0.043 mole) of phthalic anhydride was placed in a stainless beaker. The mixture was heated, and when the mixture reached about 120° C., it became a transparent solution, and then 1 g of triphenyl phosphite was added to the solution and stirred. The solution was then poured into the same mold as used in Example 1 and was left standing at 200° C. for 1 hour to allow the mixture to form an insoluble and infusible cross-linked resin sheet.

The resin sheet was found to have a thermal deflection temperature of 97° C.

EXAMPLE 5

A mixture of 71.4 g (0.33 mole) of 1,3-bis(2-oxazolinyl-2)benzene, 14.2 g (0.097 mole) of adipic acid, 14.4 g (0.097 mole) of phthalic anhydride and 1.0 g of tris(p-chlorophenyl) phosphite was placed in a stainless beaker. The mixture was heated to melt together, and then was poured into the same mold as used in Example 1 and was left standing at 200° C. for 30 minutes, to form an yellow, transparent, insoluble and infusible, and very hard cross-linked resin sheet, which was found to have the following properties.

| | |
|---|---|
| Thermal deflection temperature | 148° C. |
| Flexural strength | 20.0 kgf/mm$^2$ |
| Flexural modulus | 500 kgf/mm$^2$ |
| Surface hardness (Shore D) | 94 |

EXAMPLE 6

A mixture of 77.7 g (0.359 mole) of 1,3-bis(2-oxazolinyl-2)benzene, 7.0 g (0.0346 mole) of sebacic acid, 5.5 g (0.0398 mole) of p-hydroxy benzoic acid, 5.5 g (0.0398 mole) of salicylic acid and 4.3 g (0.029 mole) of phthalic anhydride was placed in a stainless beaker, and was heated to melt together. When the mixture became slurry, 1.0 g of triphenyl phosphite was added to the mixture. When the temperature of the mixture reached about 125° C., the mixture completely melted to form a viscous liquid. The liquid was then poured into the same mold as used in Example 1 and was left standing at 200° C. for 1 hour.

The cured product was found to have a thermal deflection temperature of 215° C.

EXAMPLE 7

A mixture of 62.8 g (0.290 mole) of 1,3-bis(2-oxazolinyl-2)benzene, 35.3 g (0.175 mole) of sebacic acid, 1.9 g (0.019 mole) of succinic anhydride and 1.0 g of triphenyl phosphite was placed in a stainless beaker. The mixture was heated to melt together, and then was poured into the same mold as used in Example 1 and was left standing at 200° C. for 1 hour.

The resultant resin product was found to have the following properties.

| | |
|---|---|
| Thermal deflection temperature | 73° C. |
| Flexural strength | 16.7 kgf/mm$^2$ |
| Flexural modulus | 360 kgf/mm$^2$ |
| Surface hardness (Shore D) | 89 |

EXAMPLE 8

A mixture of 45.4 g (0.21 mole) of 1,3-bis(2-oxazolinyl-2)benzene, 20.7 g (0.14 mole) of phthalic anhydride, 2.0 g (0.1 mole) of water and 0.55 g of triphenyl phosphite was placed in a stainless beaker. The mixture was heated, and when the mixture reached about 150° C., it melted completely. The mixture was placed on an aluminum dish, and was left standing at 160° C. in an oven for 1 hour.

The resultant cross-linked resin was yellow, transparent, insoluble and infusible.

EXAMPLE 9

An amount of 103.4 g (0.478 mole) of 1,3-bis(2-oxazolinyl-2)benzene, 37.2 g (0.255 mole) of adipic acid, 9.4 g (0.0635 mole) of phthalic anhydride and 1.5 g of triphenyl phosphite were mixed together, heated and melted. Nine plies of glass cloth WE22D104B (Nitto Boseki Company Ltd.) were placed one on the other on a hot plate of 105° C., and the above melted mixture was poured thereonto. The surface was covered with polytetrafluoroethylene film, defoamed, and was left standing for cooling.

The resultant prepreg was disposed between a pair of heated plates of 20 ⓇC. for 1 hour, to provide a layered resin product, which was found to have the following properties.

| Tensile strength | 25.5 kgf/mm² |
|---|---|
| Tensile modulus | 2350 kgf/mm² |
| Elongation | 1.53% |
| Flexural strength | 51.0 kgf/mm² |
| Flexural modulus | 2030 kgf/mm² |

EXAMPLE 10

An amount of 107 g (0.495 mole) of 1,3-bis(2-oxazolinyl-2)benzene, 12.2 g (0.088 mole) of p-hydroxy benzoic acid, 12.2 g (0.088 mole) of salicylic acid, 5.0 g (0.025 mole) of sebacic acid, 4.4 g (0.03 mole) of phthalic anhydride and 1.5 g of triphenyl phosphite were mixed together, heated and melted.

The same proceedure as in Example 9 was repeated with the use of the above mixture to provide a layered resin product, which was found to have the following properties.

| Tensile strength | 20.3 kgf/mm² |
|---|---|
| Tensile modulus | 1880 kgf/mm² |
| Flexural strength | 41.2 kgf/mm² |
| Flexural modulus | 1990 kgf/mm² |

EXAMPLE 11

An amount of 51.9 g (0.24 mole) of 1,3-bis(2-oxazolinyl-2)benzene, 12.0 g (0.064 mole) of azelaic acid, 14.2 g (0.096 mole) of phthalic anhydride, 0.865 g (0.048 mole) of water and 0.8 g of triphenyl phosphite were mixed and placed in a cylindrical mold which had been in advance heated to 160° C. After 2 minutes, the mixture became a transparent solution, and after another 9 minutes the mixture gelled. The gelled product was taken out of the mold and was found transparent, pale yellowish brown, and hard, and had a surface Shore D hardness of 93.

EXAMPLES 12–16

1,3-Bis(2-oxazolinyl-2)benzene was mixed with reactants and a catalyst shown in the table, and heated in an oil bath to melt together. The melted mixture was then poured into the same mold as used in Example 1, and was left standing at a temperature of 180° C. The thermal deflection temperatures of the resultant cross-linked products were shown in Table.

EXAMPLE 17

An amount of 46.4 g (0.215 mole) of 1,3-bis(2-oxazolinyl-2)benzene, 44.0 g (0.30 mole) of phthalic anhydride, 10.0 g (0.13 mole) of propylene glycol and 0.6 g of $CuCl_2 \cdot 2H_2O$ were mixed together and heated in an oil bath of 180° C. for 1 hour, to provide an insoluble and infusible cross-linked resin.

| Examples | Reactants and Amounts Used (mole) | | Catalyst and Amounts Used (g) | | Reaction Time (min.) | Thermal Deflection Temperature (°C.) |
|---|---|---|---|---|---|---|
| 12 | BOB* | 0.34 | Diphenyl phosphite | 0.41 | 60 | 112 |
|  | Phthalic anhydride | 0.02 |  |  |  |  |
|  | Adipic acid | 0.18 |  |  |  |  |
| 13 | BOB* | 0.34 | Diphenyl phosphite | 0.49 | 30 | 119 |
|  | Tatrabromophthalic anhydride | 0.04 |  |  |  |  |
|  | Azelaic acid | 0.16 |  |  |  |  |
| 14 | BOB* | 0.34 | Diphenyl phosphite | 0.58 | 40 | 135 |
|  | Phthalic anhydride | 0.26 |  |  |  |  |
|  | Propylene glycol | 0.06 |  |  |  |  |
| 15 | BOB* | 0.23 | VCl₃ | 0.7 | 60 | 107 |
|  | Phthalic anhydride | 0.28 |  |  |  |  |
|  | Propylene glycol | 0.12 |  |  |  |  |
| 16 | BOB* | 0.32 | Diphenyl phosphite | 0.60 | 40 | 147 |
|  | Phthalic anhydride | 0.04 |  |  |  |  |
|  | p-Hydroxy benzoic acid | 0.06 |  |  |  |  |
|  | Salicyclic acid | 0.06 |  |  |  |  |
|  | Sebacic acid | 0.04 |  |  |  |  |

*BOB = 1,3-bis(2-oxazolinyl-2)benzene

What is claimed is:

1. A cross-linked resin produced by the reaction of a (1) bis(2-oxazoline) compound with a (2) dicarboxylic acid anhydride having no active hydrogen in the molecule in a molar ratio of the dicarboxylic acid anhydride to the bis(2-oxazoline) compound of not more than about 2, a (3) dicarboxylic acid and a (4) hydroxy-carboxylic acid, in the presence of at least one catalyst selected from the group consisting of an organic phosphorous acid ester, an organic phosphonous acid ester and an inorganic salt at an elevated temperature.

2. The cross-linked resin as claimed in claim 1, wherein the dicarboxylic acid anhydride is an aromatic dicarboxylic acid anhydride.

3. The cross-linked resin as claimed in claim 1, wherein the dicarboxylic acid is an aliphatic dicarboxylic acid.

4. The cross-linked resin as claimed in claim 1, wherein the hydroxy-carboxylic acid is an aromatic hydroxy-carboxylic acid.

5. The cross-linked resin as claimed in claim 2, wherein the aromatic dicarboxylic acid anhydride is phthalic anhydride.

6. The cross-linked resin as claimed in claim 1, wherein the catalyst is a phosphorous acid triester.

7. The cross-linked resin as claimed in claim 1, wherein the catalyst is a phosphorous acid diester.

8. The cross-linked resin as claimed in claim 1, wherein the catalyst is used in amounts of 0.1–5% by weight based on the weight of a mixture of the reactants.

9. A process for producing a cross-linked resin which comprises: reacting a (1) bis(2-oxazoline) compound with a (2) dicarboxylic acid anhydride having no active hydrogen in the molecule in a molar ratio of the dicarboxylic acid anhydride to the bis(2-oxazoline) compound of not more than about 2, a (3) dicarboxylic acid and a (4) hydroxy-carboxylic acid, in the presence of at least one catalyst selected from the group consisting of an organic phosphorous acid ester, an organic phosphonous acid ester and an inorganic salt at an elevated temperature.

10. The process as claimed in claim 9, wherein the dicarboxylic acid anhydride is an aromatic dicarboxylic acid anhydride.

11. The process as claimed in claim 9, wherein the dicarboxylic acid is an aliphatic dicarboxylic acid.

12. The process as claimed in claim 9, wherein the hydroxy-carboxylic acid is an aromatic hydroxy-carboxylic acid.

13. The process as claimed in claim 10, wherein the aromatic dicarboxylic acid anhydride is phthalic anhydride.

14. A resin composition which comprises: a cross-linked resin produced by the reaction of a (1) bis(2-oxazoline) compound with a (2) dicarboxylic acid anhydride having no active hydrogen in the molecule in a molar ratio of the dicarboxylic acid anhydride to the bis(2-oxazoline) compound of not more than about 2, a (3) dicarboxylic acid and a (4) hydroxy-carboxylic acid, in the presence of at least one catalyst selected from the group consisting of an organic phosphorous acid ester, an organic phosphonous acid ester and an organic salt at an elevated temperature, and reinforcement material or a filler or both in amounts of about 3–95% by weight, respectively, based on the resin composition.

15. The resin composition as claimed in claim 14, wherein the reinforcement is fibers.

16. A process for producing a resin composition which comprises: heating a reactant mixture of a (1) bis(2-oxazoline) compound with a (2) dicarboxylic acid anhydride having no active hydrogen in the molecule in a molar ratio of the dicarboxylic acid anhydride to the bis(2-oxazoline) compound of not more than about 2, a (3) dicarboxylic acid and a (4) hydroxy-carboxylic acid to fluidize the reactant mixture; mixing or impregnating a reinforcement material, a filler or both with the fluidized reactant mixture, the reinforcement material, filler, or both being in amounts of about 3–95% by weight, respectively, based on the resin composition; and heating the resulant composite in the presence of at least one catalyst selected from the group consisting of an organic phosphorous acid ester, an organic phosphonous acid ester and an inorganic salt.

17. The process as claimed in claim 16, wherein the reinforcement material is fibers.

* * * * *